(12) United States Patent
Oxley et al.

(10) Patent No.: US 11,300,542 B2
(45) Date of Patent: Apr. 12, 2022

(54) APPARATUS AND METHODS FOR PREPARATION AND INTRODUCTION OF TRACE SAMPLES INTO AN IONIZING DETECTION SYSTEM

(71) Applicant: University of Rhode Island Board of Trustees, Kingston, RI (US)

(72) Inventors: Jimmie Oxley, Narragansett, RI (US); James L. Smith, Narragansett, RI (US); Alexander Yevdokimov, Norwich, CT (US); Gerald Kagan, Foxboro, MA (US)

(73) Assignee: University of Rhode Island Board of Trustees, Kingston, RI (US)

( * ) Notice: Subject to any disclaimer, the term of this patent is extended or adjusted under 35 U.S.C. 154(b) by 0 days.

(21) Appl. No.: 16/804,787

(22) Filed: Feb. 28, 2020

(65) Prior Publication Data

US 2020/0292495 A1 Sep. 17, 2020

Related U.S. Application Data

(60) Provisional application No. 62/816,253, filed on Mar. 11, 2019.

(51) Int. Cl.
| | | |
|---|---|---|
| *H01J 49/00* | (2006.01) | |
| *G01N 27/622* | (2021.01) | |
| *H01J 49/04* | (2006.01) | |
| *H01J 49/02* | (2006.01) | |

(52) U.S. Cl.
CPC ........ *G01N 27/622* (2013.01); *H01J 49/0031* (2013.01); *H01J 49/0409* (2013.01); *H01J 49/025* (2013.01)

(58) Field of Classification Search
CPC ............ G01N 27/622; G01N 2001/028; H01J 49/0409; H01J 49/0031; H01J 49/025; H01J 49/16
USPC ......................................... 250/281, 282, 288
See application file for complete search history.

(56) References Cited

U.S. PATENT DOCUMENTS

| | | |
|---|---|---|
| 8,704,167 B2 | 4/2014 | Cooks et al. |
| 8,710,437 B2 | 4/2014 | Cooks et al. |
| 8,859,986 B2 | 10/2014 | Cooks et al. |
| 8,895,918 B2 * | 11/2014 | Cooks ................... G01N 30/91 250/282 |
| 8,932,875 B2 | 1/2015 | Cooks et al. |

(Continued)

FOREIGN PATENT DOCUMENTS

CN 102636553 B 5/2014

*Primary Examiner* — Michael Maskell
(74) *Attorney, Agent, or Firm* — Barlow, Josephs & Holmes, Ltd.; Stephen J. Holmes

(57) ABSTRACT

The present disclosure describes an improved sample preparation technique and adapter device for the removal of trace materials from swabs and delivery of the trace materials into a mass spectrometer (MS) or an ion mobility spectrometer (IMS). The adapter device and technique aids the delivery of the analyte into the instrument inlet and concurrently serves as an ionization source. The technique includes the steps of positioning or shaping the swab so that a pointed analyte release corner or tip is directed toward the inlet of the MS or IMS, adding a solvent to the swab and charging the swab to create an ionized analyte spray pointed at or positioned within the inlet of the detection instrument.

20 Claims, 19 Drawing Sheets

(56) References Cited

U.S. PATENT DOCUMENTS

| | | |
|---|---|---|
| 8,937,288 B1 | 1/2015 | Cooks et al. |
| 9,035,239 B1 | 5/2015 | Cooks et al. |
| 9,116,154 B2 | 8/2015 | Ouyang et al. |
| 9,165,752 B2 | 10/2015 | Cooks et al. |
| 10,088,461 B2 | 10/2018 | Cooks et al. |
| 2013/0344610 A1* | 12/2013 | Cooks .................... H01J 49/42 436/141 |
| 2014/0183351 A1* | 7/2014 | Cooks ................ H01J 49/0431 250/282 |

* cited by examiner

Mass Spectrometer

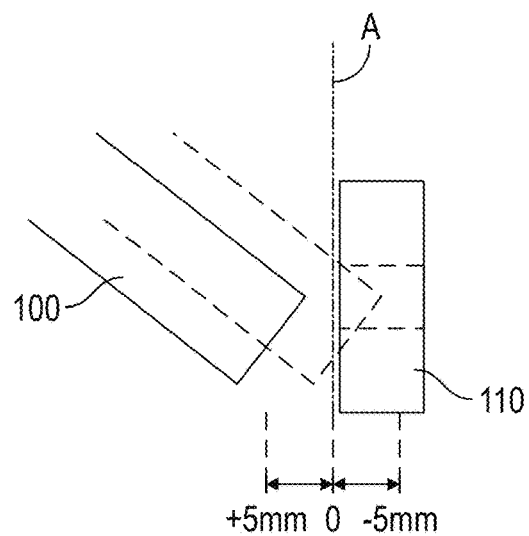 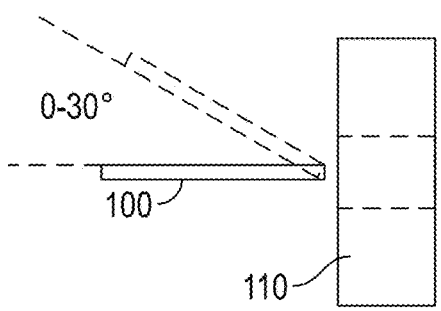
FIG. 8A  FIG. 8B
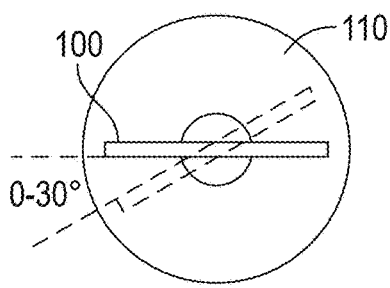
FIG. 8C
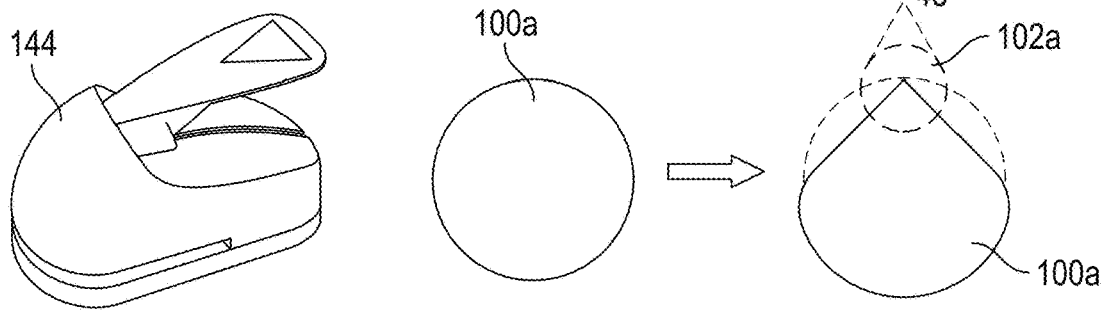
FIG. 9

APPARATUS AND METHODS FOR PREPARATION AND INTRODUCTION OF TRACE SAMPLES INTO AN IONIZING DETECTION SYSTEM

CROSS-REFERENCE TO RELATED APPLICATIONS

This application is related to and claims benefit of U.S. Provisional Application No. 62/816,253 filed Mar. 11, 2019, the entire contents of which are incorporated herein by reference.

STATEMENT OF GOVERNMENT INTEREST

This invention was made with government support under Grant No. HSHQDC-15-C-B0051 awarded by DHS/ST. The government has certain rights in the invention.

BACKGROUND OF THE DISCLOSURE

The present invention generally relates to chemical detection systems and more specifically to illicit and dangerous substance trace detection systems, which are used in airports and other facilities for screening.

Ion Mobility Spectrometry (IMS) and Mass Spectrometry (MS) are known techniques for chemical detection.

Ion Mobility Spectrometry (IMS) is an atmospheric pressure chemical detection technology that is, in many ways, similar to Time-of-Flight Mass Spectrometry. Samples need to be in a gas phase for detection with an IMS system. Vaporized samples containing the analyte of interest are analyzed directly by drawing them into the IMS air flow system. Trace levels of explosive materials, drugs and chemical warfare agents can all be detected in this way. In existing IMS systems, samples are driven from a substrate or swab by applying heat from a desorber. Thus, non-volatile materials cannot be detected. Heat results in their decomposition rather than their desorption.

Sample material released into the IMS instrument by thermal desorption is then ionized to form reactant ion species from the gas employed in the system, normally air. Mixing these stable reactant ion clusters with vapor samples to be analyzed can result in ionization of the sampled materials, thus forming ion clusters characteristic of the sample material. A small packet of formed ions is guided by an electromagnetic field through a drift tube towards a detector, where they eventually strike a collector electrode to produce a signal. Ions travel through the drift tube guided by the electromagnetic field and opposed by a gas countercurrent. As a result, characteristic clusters of ions are formed based on analytes' size and shape, which in turn produce specific drift speeds that can be further correlated to a calibration standard to create a final plasmogram result.

FIG. 1 illustrates, as prior art, an early portable IMS instrument generally indicated at 10. A swab 12, which has sampled an area of interest, is held in front of the inlet slot with a holder 14. A desorber heater heats the air around the swab or the swab itself to release volatile trace chemicals from the sample swab. Once inside the instrument 10, the gas analyte is ionized and passes through various magnetic grids to the collector/detector.

Mass Spectrometry (MS) is a similar analytical technique that ionizes chemical species and sorts the ions based on their mass-to-charge ratio. Mass spectrometry is used in many different fields and is applied to pure samples as well as complex mixtures.

FIG. 2 is a schematic of an exemplary magnetic sector mass spectrometer (MS) instrument generally indicated at 20. In a typical MS testing procedure, a sample, which may be solid, liquid, or gas is first converted to vapor (operation not shown on schematic). The vapor 22 is ionized in an ionization region 24, for example by a corona discharge needle. This may cause some of the molecules in the sample to break into charged fragments. These ions are then separated according to their mass-to-charge ratio, typically by accelerating them in an acceleration region 26 and then subjecting them to an electromagnetic field 28. Ions of the same mass-to-charge ratio will undergo the same amount of deflection by the electromagnetic field 28. The ions are counted by a detector 30, such as an electron multiplier. Results are displayed as spectra of the relative abundance of detected ions as a function of the mass-to-charge ratio. The original structure of the analyte can be elucidated by the observed mass-to-charge ratio and characteristic fragmentation pattern.

For a number of different purposes, including environmental testing, law enforcement, security and field detection, samples requiring MS or IMS analysis are collected on swabs.

FIGS. 3a-3c illustrate a prior art rectangular swab 50 and holder 52 and introduction of the swab 50 into an exemplary prior art IMS instrument 54 for testing. At the present time, swabs collected for travel security screening are tested directly without further sample preparation primarily because of time and technique constraints. This is a balance between adequate security and the need to move people through checkpoints at a reasonable pace.

FIG. 4 illustrates another prior art swab 60 and holder 62.

FIG. 5 still further illustrates additional swab shapes 70, 80, 90 currently being used in industry.

For obvious reasons, the reliability and speed of testing of the collected swabs is critical, for particularly for security screening at travel checkpoints, i.e. airports, cruise and border crossing. Accordingly, there is a perceived need for enhancement of the sample preparation to improve testing results without sacrificing testing speed.

SUMMARY OF THE INVENTION

The present disclosure teaches a novel sample preparation technique and provides an adapter/holder which aids in the delivery of the analyte into the instrument inlet and concurrently serves as an ionization source.

The technique includes adding a solvent to the swab to better dissolve and release any trace chemicals contained on the swab, charging of the solvated swab to create an ionized analyte prior to entry into the detection instrument, and positioning of the charged swab so that a sharp corner, or a shaped angled tip of the swab faces the inlet into the detection instrument. The technique may be referred to as Ambient Desorption Ionization (ADI).

In cases where the swab includes pre-existing corners, i.e. 90 degree square corners, or otherwise, the swab can be used without modification (see swabs 50, 70, 80, 90 as illustrated in FIGS. 3a and 5).

As a first step in the technique, the swab is positioned so that an optimally angled corner or tip (analyte release area) faces the instrument inlet port to aid in creation of a directed ionized plume at the inlet of the detector. The swab is preferably held in an adapter/holder which is integrated into, or is configured for mounting onto, or positioning in front of, an existing MS/IMS detector device so that the corner or angled tip is within ±5 mm of the entrance to detector. The adapter positions the swab and provides the high voltage connection. A solvent supply for the technique may also be supported by the adapter/holder.

The sample swab is energized by applying a high voltage to ionize the analyte and create ions which are directed toward the detector inlet. The detector inlet is grounded or has a differential potential in order to attract the ionized species into the detector inlet. The existing detector units thereafter function as intended for analysis.

In the alternative, if the swab lacks a pre-existing corner, such as the round swab 60 illustrated in FIG. 4, it can be quickly modified by cutting or otherwise shaping the swab. A shaping punch tool can be provided to quickly cut the swab 60 and create the desired angled tip or corner.

The novel technique is thus intended to improve release of chemical residue from the sample swabs and improve detection. Sample introduction and ionization are combined in a single step process making this invention particularly useful for MS/IMS, since this new technique allows non-volatile compounds to enter and flow through the instrument.

The invention advantageously allows the use of existing swabs directly as the ionization source, given the availability of a high voltage supply internal or external, and also eliminates the need for other types of ionization sources, for example radioactive material or corona discharge.

The ability to use present swab materials and holders is critically important in large scale deployment of the technique, and depending on the IMS or MS device, the present technique and adapter may require no change in swab materials; and if the instrument is presently portable, it remains so.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

FIGS. 8a-8c schematically illustrate exemplary positioning angles for holding the sample swab in front of the inlet port of the testing instrument;

FIG. 9 illustrates a circular sample swabs and an exemplary stamp or punch which is configured to cut/shape the circular swab to provide it with an analyte release tip having preferred release angle;

DETAILED DESCRIPTION OF THE EXEMPLARY EMBODIMENTS

Figure 1:
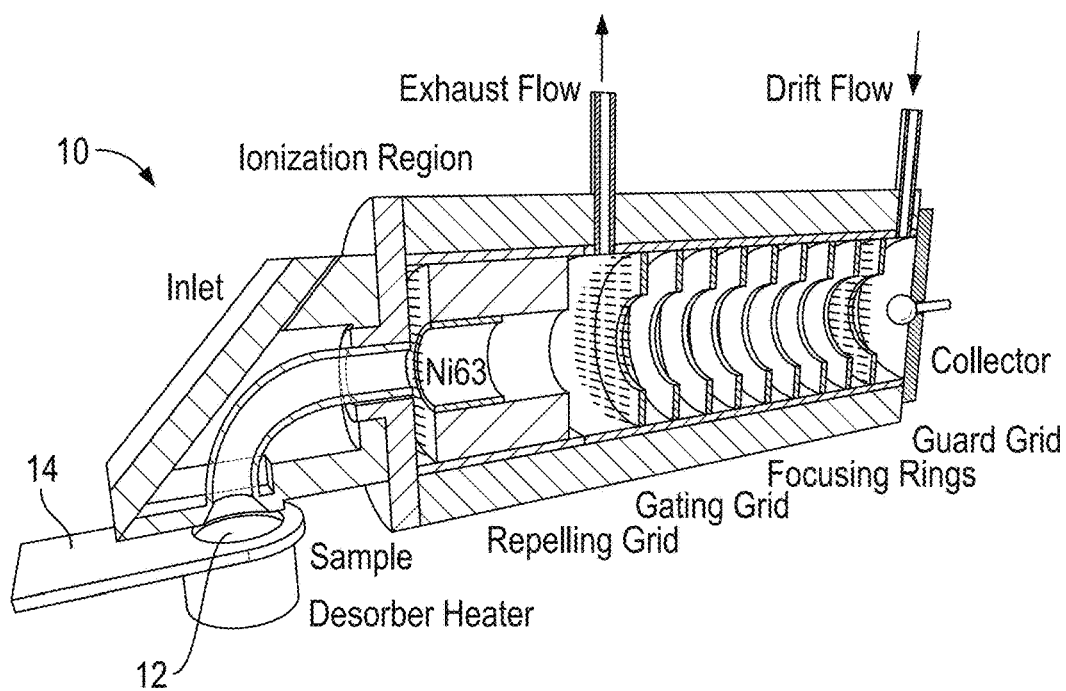
FIG. 1 illustrates an exemplary prior art Ion Mobility Spectrometer (IMS)
Figure 2:
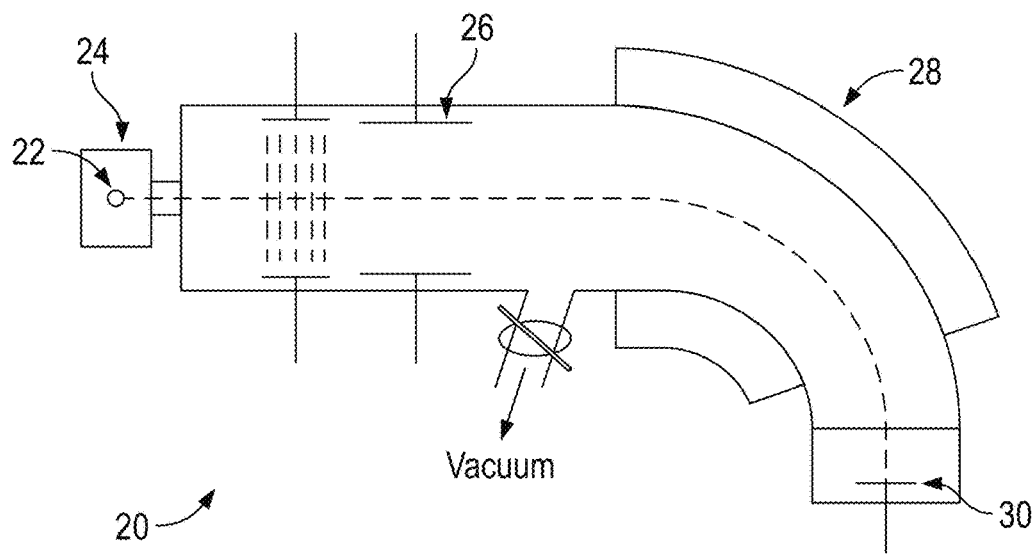
FIG. 2 illustrates an exemplary prior art magnetic sector Mass Spectrometer (MS)
Figure 3A:
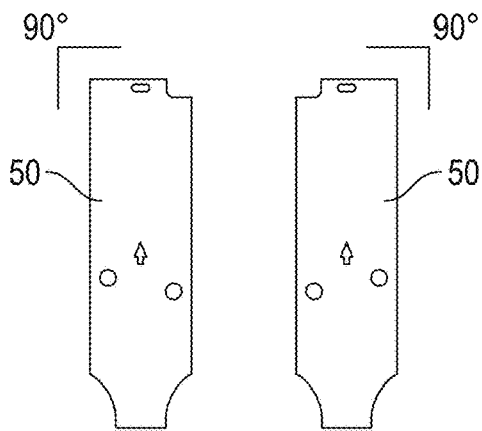
FIGS. 3a-3c illustrate a prior art sample swab (rectangular), wand and detector instrument.
Figure 3B:
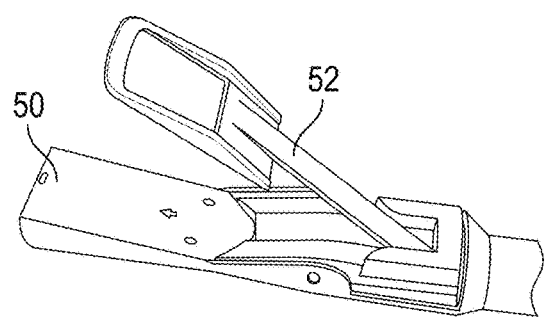
Figure 3C:
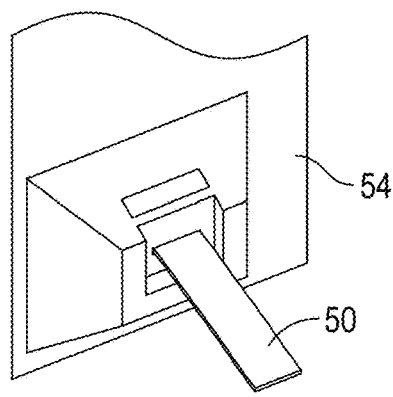

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments may have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like proximal, distal, top, bottom, up, or down are used, they are not intended to limit the systems, devices, and methods disclosed herein. A person skilled in the art will recognize that these terms are merely relative to the system and device being discussed and are not universal.

Referring now to the drawings, exemplary embodiments of the invention are generally described and illustrated in the attached figures. The present disclosure teaches a novel sample introduction technique and provides an adapter/holder which aids the delivery of the analyte into the testing instrument inlet and concurrently can serve as an ionization source. The technique includes adding a solvent, charging the swab to create an ionized analyte plume, which, due to positioning of the swab corner or shaping of the swab, more efficiently directs the ion plume into the entry of the detection device.

Referring now to FIGS. 6-11, the technique and adapter/holder apparatus are illustrated in accordance with the invention. A swab is generally indicated at 100 and includes an optimally angled analyte release area 102 having an apex angle measuring from about 30 degrees to about 120 degrees. The illustrated example is a conventional rectangular swab having a distal end with a pre-existing corner angle of about 90 degrees. Any existing swab material may be utilized, although materials with a rougher surfaces, grooves or channels may produce improved results. A particularly suitable sampling swab material is described in U.S. Pat. No. 9,200,992, the entire contents of which are incorporated herein by reference.

In use, the swab 100 will be contacted with an object to be tested and will thereafter carry a trace chemical residue 104.

An MS or IMS instrument is provided and generally indicated at 106. The MS/IMS instrument 106 is conventional in the art and generally operational as described hereinabove. The instrument 106 has a housing 108 and an inlet port 110. Generally described, to create an ionized plume of analyte directed into the inlet 110 of the instrument 106, an optimally angled corner or tip (analyte release area) 102 of the sample swab 100 is pointed at and preferably positioned within ±5 mm of the inlet port 110 of the instrument 106.

A solvent supply is provided and generally indicated at 112. The solvent supply 112 includes a container 114 for holding the solvent 116 and a dispenser 118 which may be advantageously positioned to selectively apply solvent 116 to the swab 100.

Solvents 116 may include water, methanol, ethanol, isopropanol or other alcohols, acetonitrile, acetone, benzene, hexane, ethyl acetate, DMF, THF, a combination of solvents, or aqueous buffers. Ethanol may be considered a preferred solvent.

Use of an aqueous buffer allows introduction of potential adduct forming species or dopants. Examples of such species include chloride, formate, acetate, ammonium, sodium, potassium, nitrate.

A high voltage source 120 is provided for charging of the swab 100 and generally includes a ground 122. Where necessary for safety the ground can be provided by connection to the instrument inlet port 110. A power contact (+/−) 124 which is connected to the swab 100 is essential to the technique. In this regard, in order to grab or hold the swab 100 and provide the needed charge adjacent to the analyte release area 102, the apparatus may include a contact clip 126 which may have spring fingers (as illustrated) which frictionally grasp the swab 100. The clip 126 may also comprise a spring-loaded clamp or clip device. The contact clip 126 is preferably a disposable component which can be discarded after each use to prevent cross-contamination from one sampling swab to another. In this regard, the body of the clip is releasably connected with the power contact 124, in a sliding socket 128 (as illustrated), or otherwise as known in the connector art.

Figure 7:
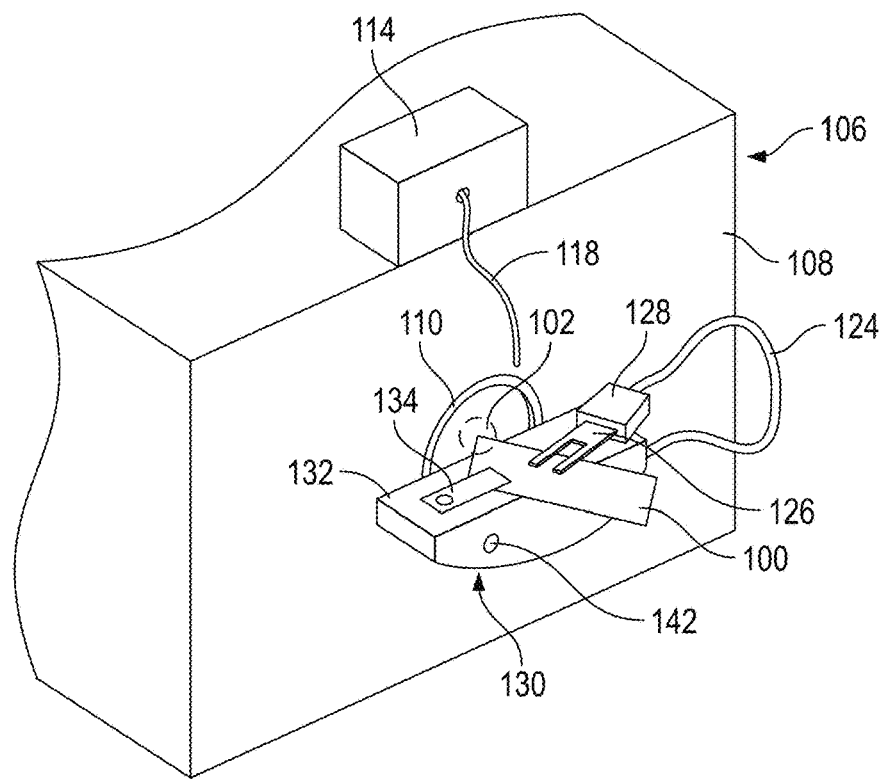
FIG. 7 illustrates an exemplary testing instrument including the present sample preparation apparatus.
Figure 10:
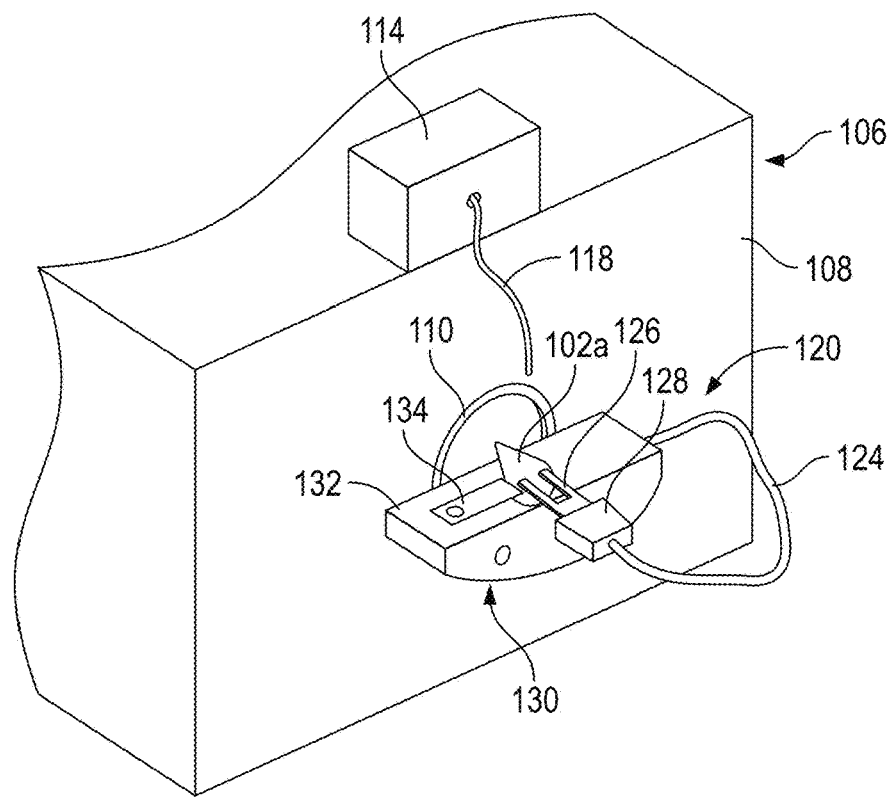
FIG. 10 is another schematic illustration of the exemplary testing instrument with the shaped swab as illustrated in FIG. 9.
Figure 11:
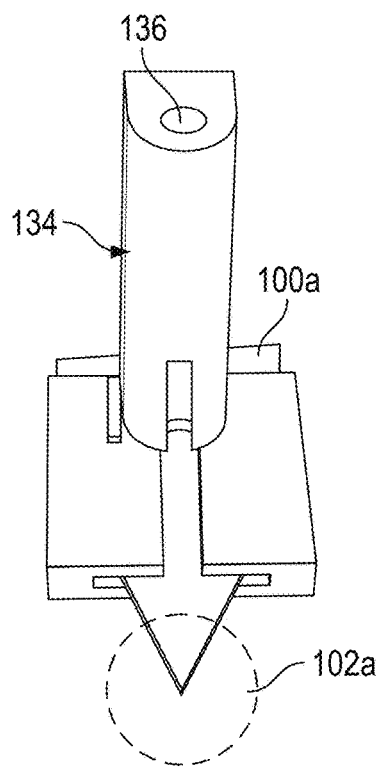
FIG. 11 illustrates an exemplary holder or adapter for positioning of the swab or shaped swab and for application of the solvent to the swab.
Figure 12A:
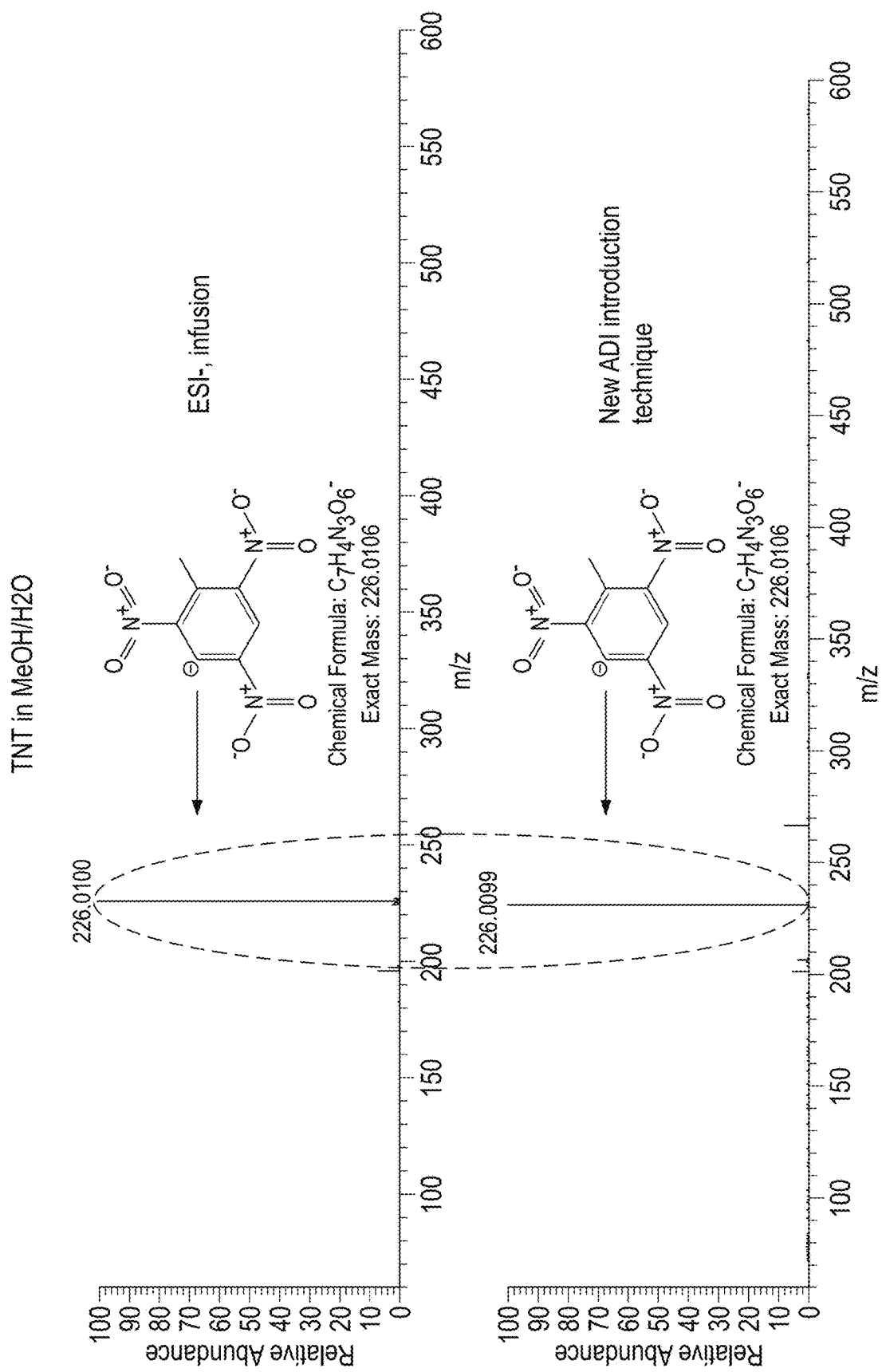
FIGS. 12a-12d illustrate test data showing the same or similar performance between the present ADI technique and an ElectroSpray Ionization (ESI) technique on an LTQ-Orbitrap instrument.
Figure 12B:
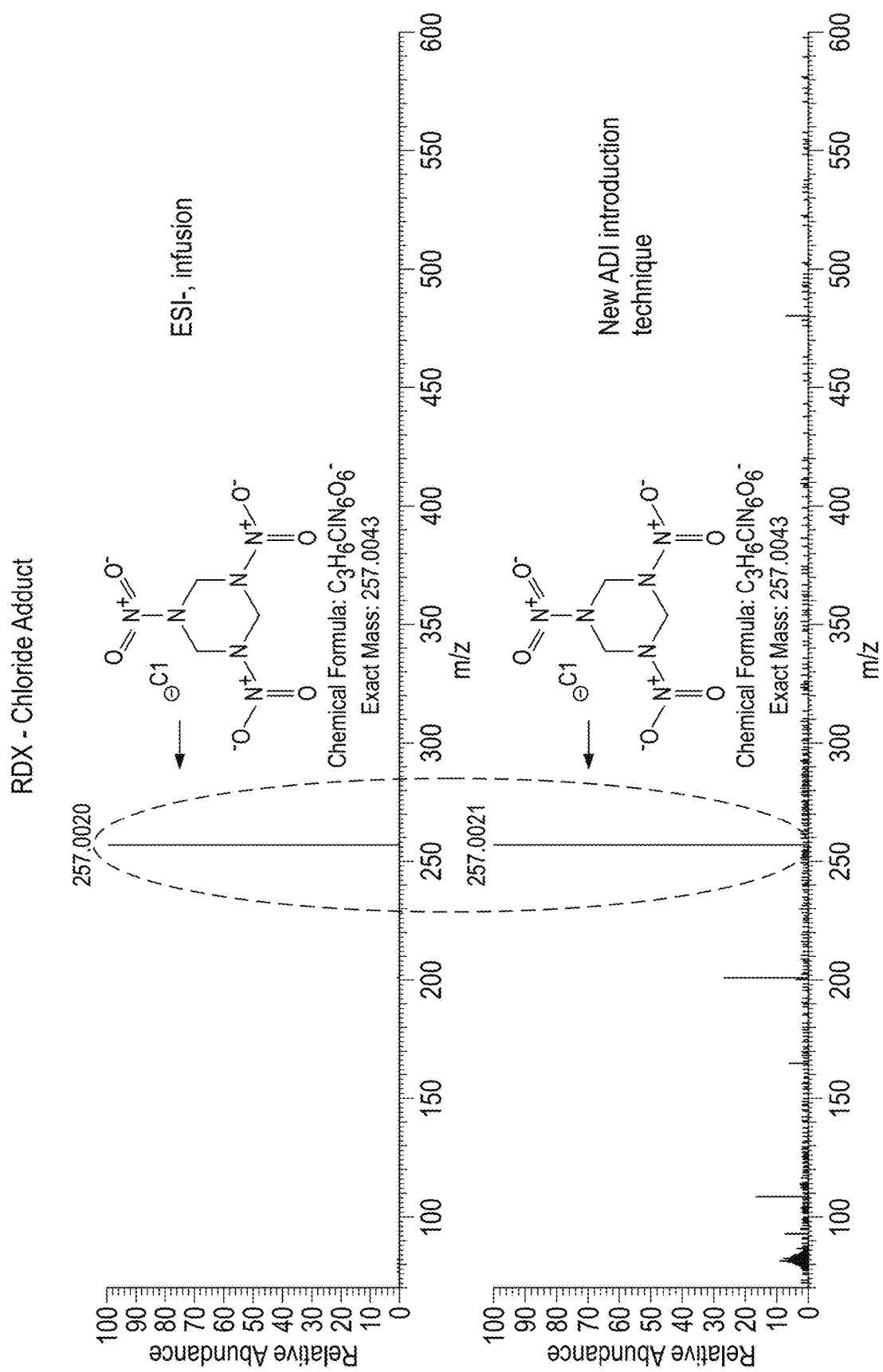
Figure 12C:
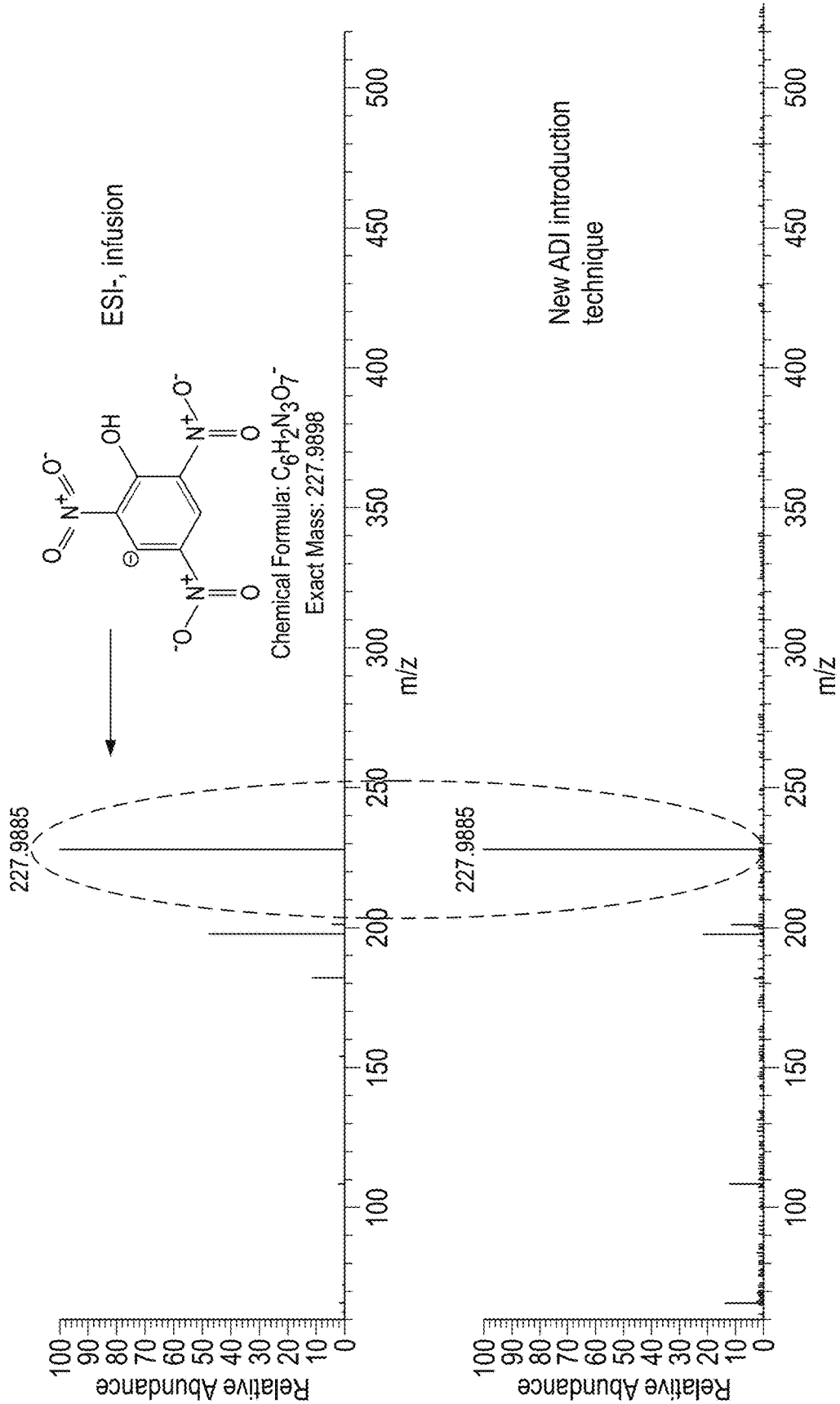
Figure 12D:
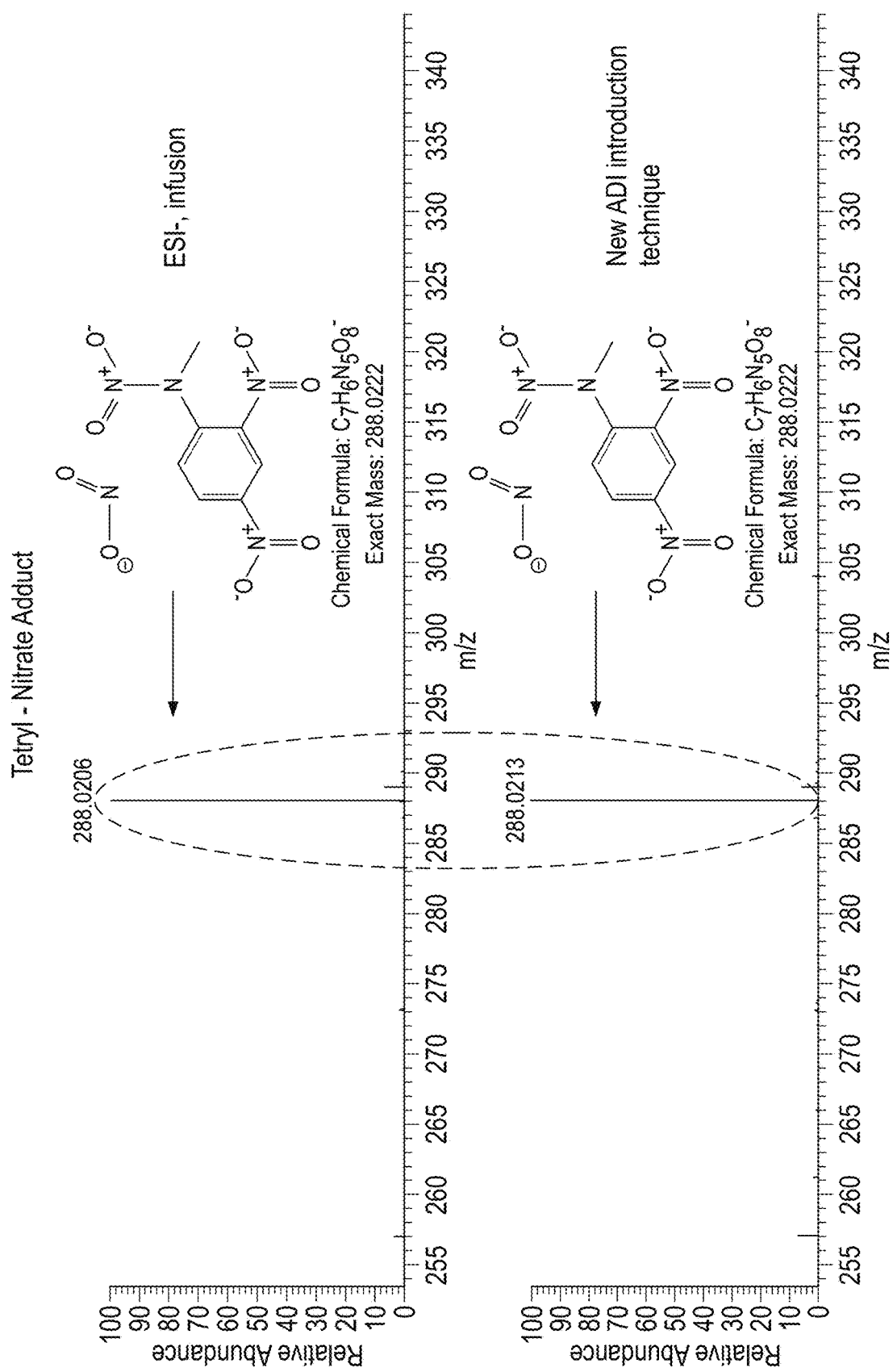
Figure 13A:
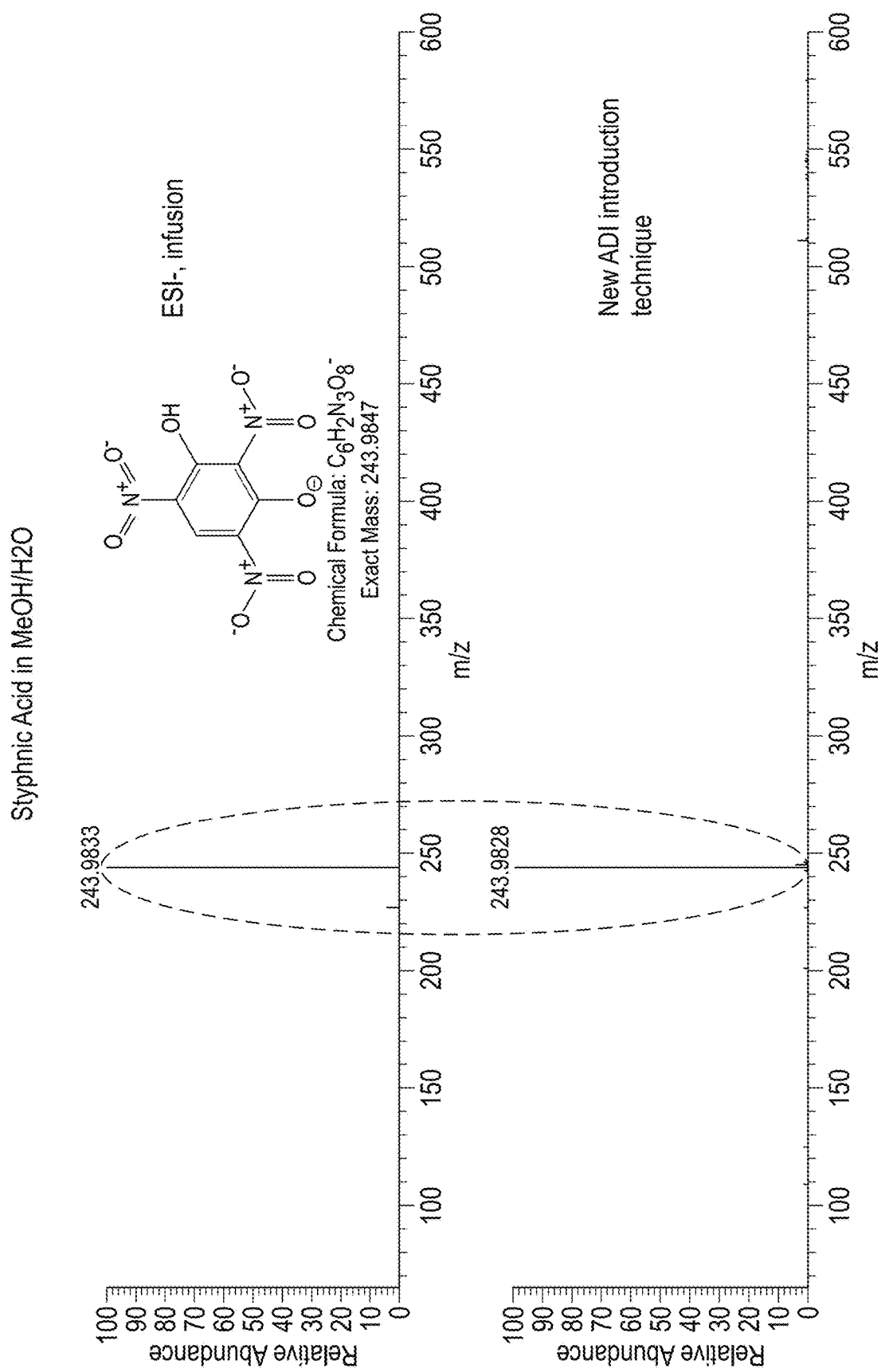
FIGS. 13a-13d illustrate additional test data showing the same or similar performance between the present ADI technique and ESI on an LTQ-Orbitrap instrument.
Figure 13B:
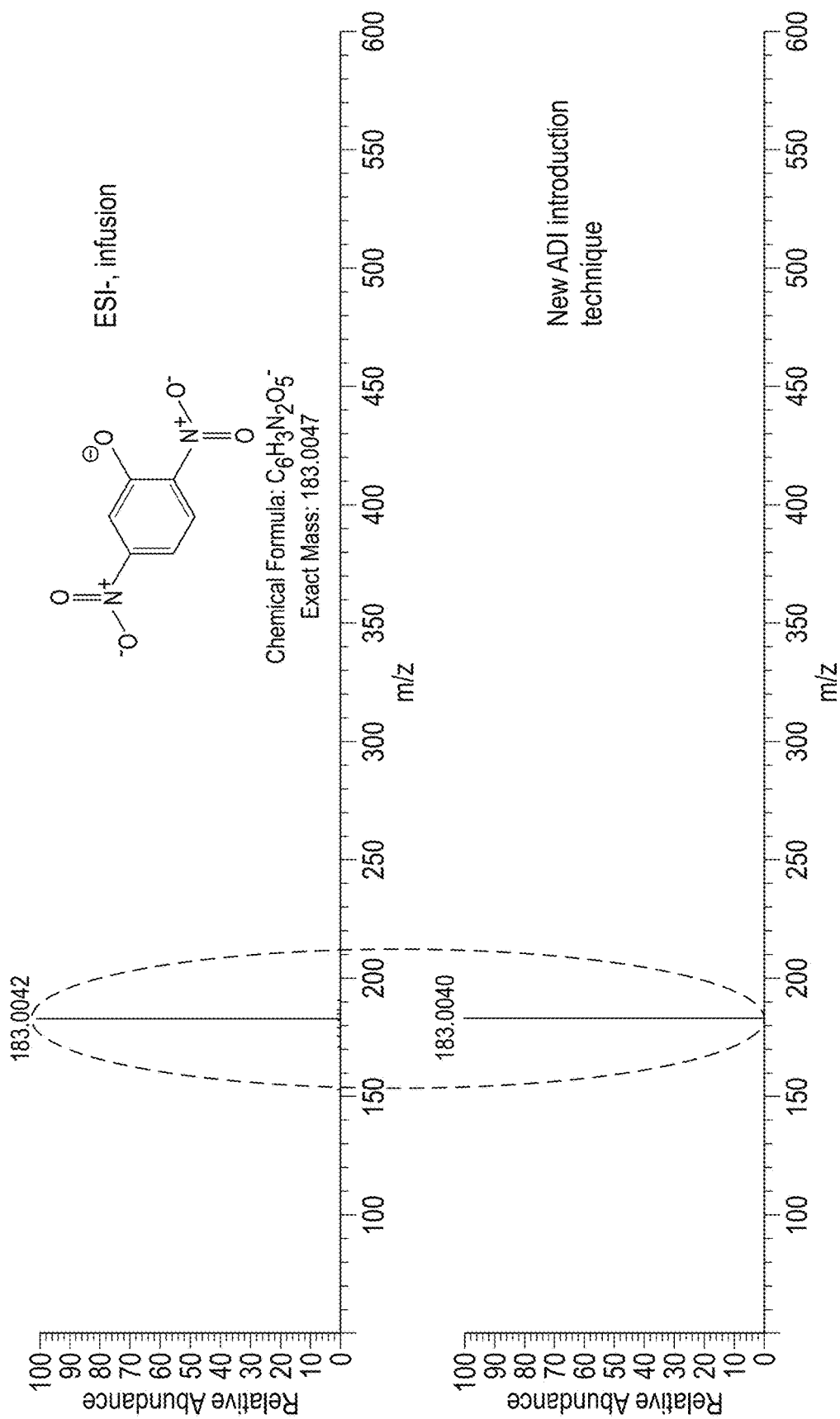
Figure 13C:
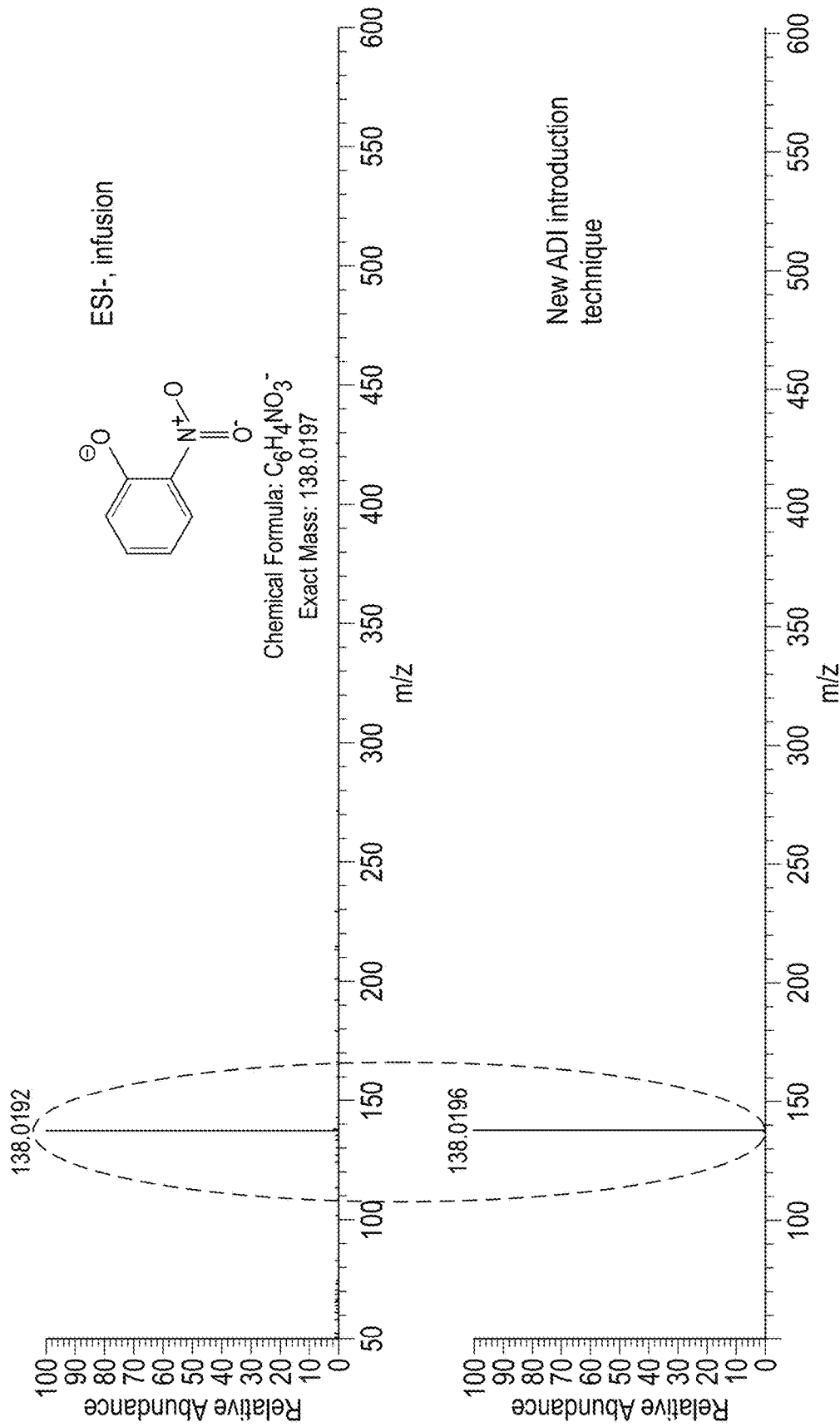
Figure 13D:
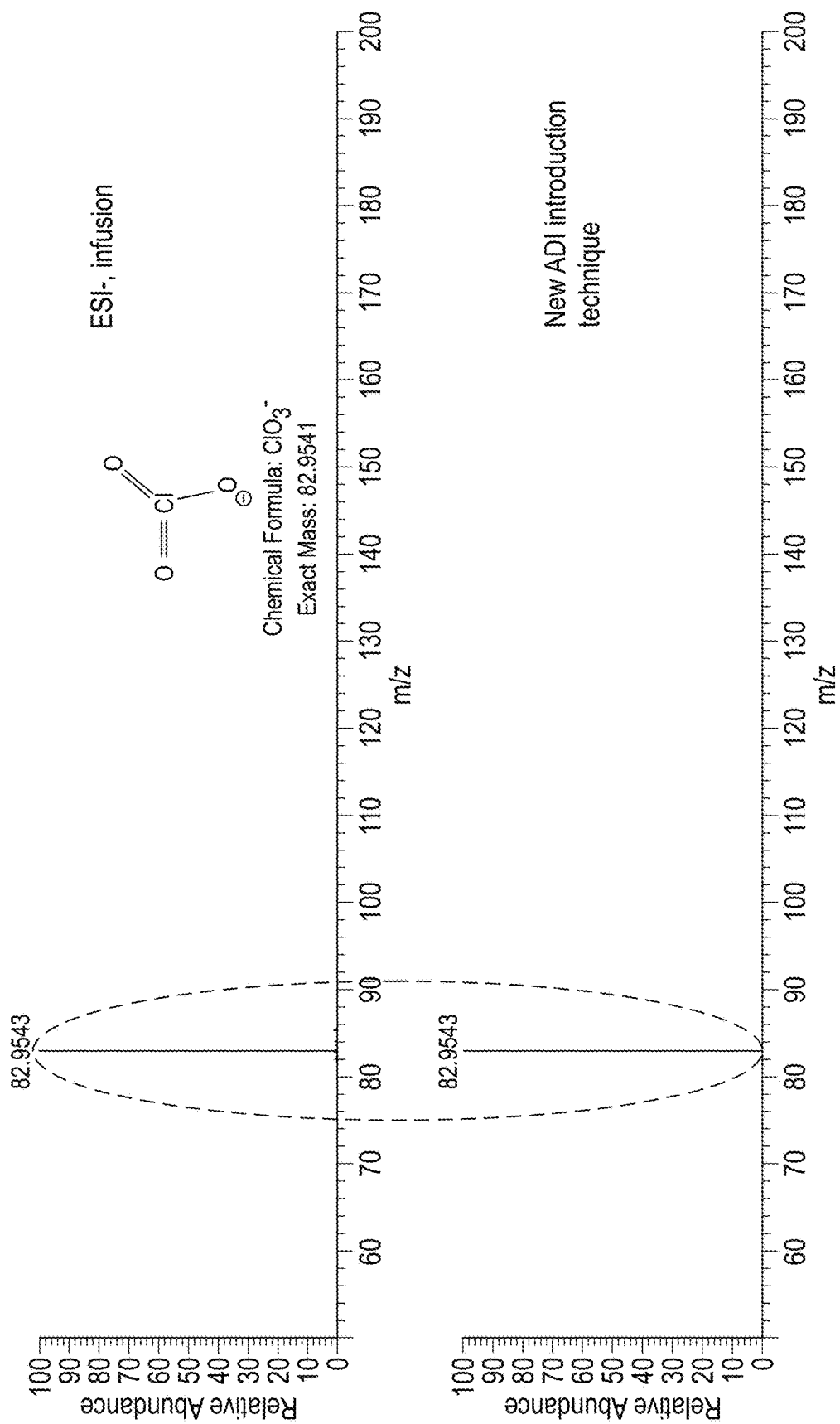

Turning now to FIG. 7, the swab 100 is mounted in/positioned on an adapter/holder 130 which is configured for mounting onto the exterior housing 108 of an existing detector-device 106. In the illustrated example, the holder 130 is received on the housing 108 of the MS/IMS device 106 and provides a platform 132 on which the sampling swab 100 can be positioned adjacent to the inlet port 110. The holder 130 has an adapter 134 (spring clip) which may frictionally hold the swab 100 in a desired position. Alternately, as seen in FIG. 11, the adapter 134 may be provided in the form of a plastic molded holder into which the swab 100 is positioned and held. The adapter 134 may then be snap received or otherwise removably positioned or mounted onto the platform 132. The adapter 134 may also provide a solvent guide port 136 which may be connected with the solvent supply dispenser 118.

Referring briefly to FIG. 8, the inlet port 110 has a defined entry plane (FIG. 8a) A and as earlier noted, the +/−5 mm positioning is defined as the tip area 102 being positioned somewhere between 5 mm inside the inlet port 110 or within 5 mm in front of the inlet port 110. FIGS. 8b and 8c also illustrate that the platform 132 of the holder 130 can be angled or tilted 0-30 degrees upward or to the left or right to provide improved gravitational disbursement of the solvent 116.

Figure 6:
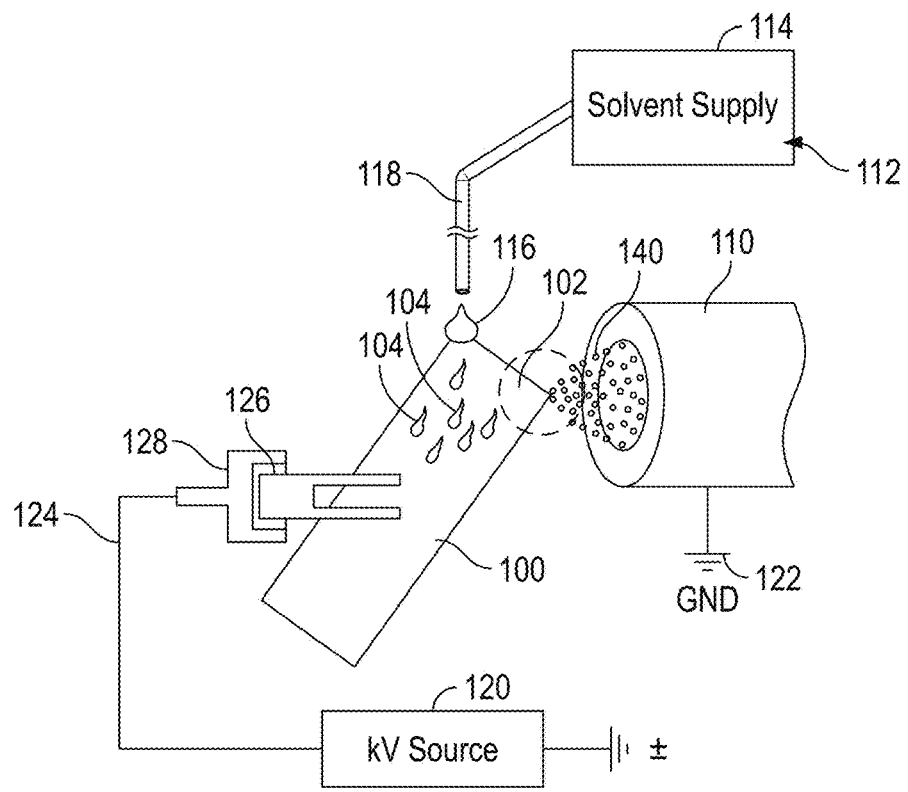
FIG. 6 schematically illustrates the preparation technique and release of the analyte from the sample in accordance with the present disclosure using an unmodified swab.

The swab holder 130 allows support of the swab 100 and direct application of an adjustable voltage (0.5V to 50 kV but less than 5 kV of floating voltage is preferred) directly behind or on or slightly above the solvated sweet spot to ionize the analyte and create an ion plume 140 directed toward the detector inlet (See FIG. 6). The voltage supply 120 may be provided with a switch 142, which may be on the holder 130, or elsewhere, to selectively apply the voltage as desired. As noted above, the inlet port 110 is grounded or held at a differential potential. The differential potential created between the swab 100 and the entrance 110 to the IMS or MS 106 acts as the equivalent of electrospray ionization and drives the analyte toward the detector inlet 110.

Alternatively, the holder 130 may be configured for placement in front of the instrument 106 so that currently deployed detector units can still be utilized. Still further, the apparatus as described herein may be fully integrated with the MS/IMS instrument for a complete integrated instrument.

Figure 4:
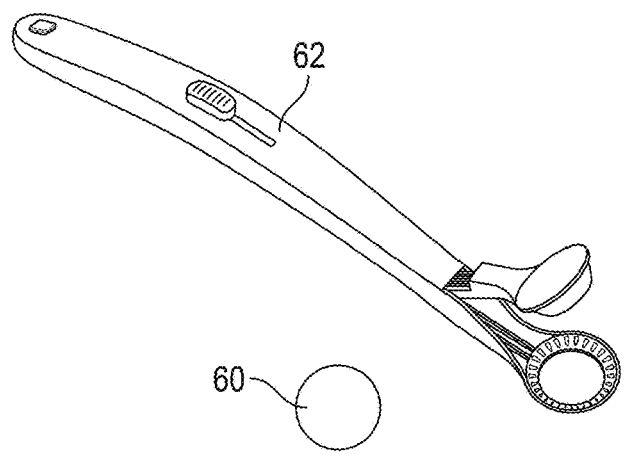
FIG. 4 illustrate a round or circular prior art swab and wand.
Figure 5A:
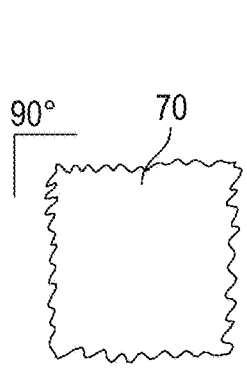
FIGS. 5a-5c illustrate additional prior art swabs which have angled corners 90-120 degrees.
Figure 5B:
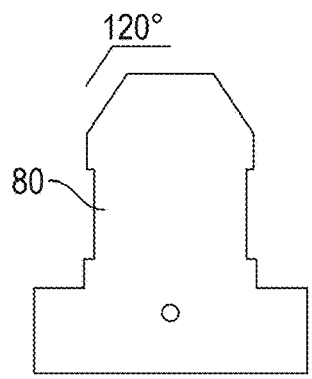
Figure 5C:
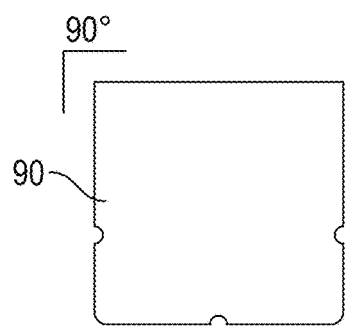

Turning to FIG. 9, if the swab has no corner, such as the circular swab illustrated in FIGS. 4 and 9, then the swab 100A can be cut or otherwise shaped to form an optimally angled tip area 102A. An exemplary angle is approximately 45 degrees but may be less or greater ranging from 30 degrees (See FIG. 11) up to and including about 120° as desired. The release area 102 may also be slightly truncated or flattened. Shaping may be accomplished by any number of means, such as manual scissors, or an external punch device 144, folding, or a pre-perforated swab (not shown) may be provided which is separated along the perforations, and/or a premade channel to direct charge and solvent.

Exemplary test data for the present ADI sampling and preparation method are illustrated in FIGS. 12-16. The proposed ADI technique was evaluated on commercially available instruments—Thermo LTQ Orbitrap XL mass spectrometer and Excellims attached to a Thermo Exactive mass spectrometer. The samples were prepared from neat materials by diluting them in appropriate solvent (e.g. acetonitrile, methanol, ethanol, isopropanol, water, but any other solvent can be used). For sample introduction, a direct infusion into the MS was employed. Resulting spectra was collected and averaged over at least 25 scans (acceptable number of scans for statistical verification of sample average response). The precursor ion was isolated and resonance energy was increased (CID in eV) until characteristic products were produced from corresponding ion. ADI produced virtually identical spectra to that of established ESI technique. Additional parameters were tested to verify the versatility of the proposed innovation. Many compounds do not ionize on their own, but can accept nearby charged species as carriers, thus forming what is known as adducts. ADI was tested on whether most common adducts can be produced (e.g. chloride, acetate, formate, ammonium, sodium, etc.)

and produced spectra was compared to prior art ESI technique. The adduct was introduced directly by dissolving ammonium chloride (200 μM) in the solvent system designed for delivery. (see FIGS. 12 and 13).

Figure 14:
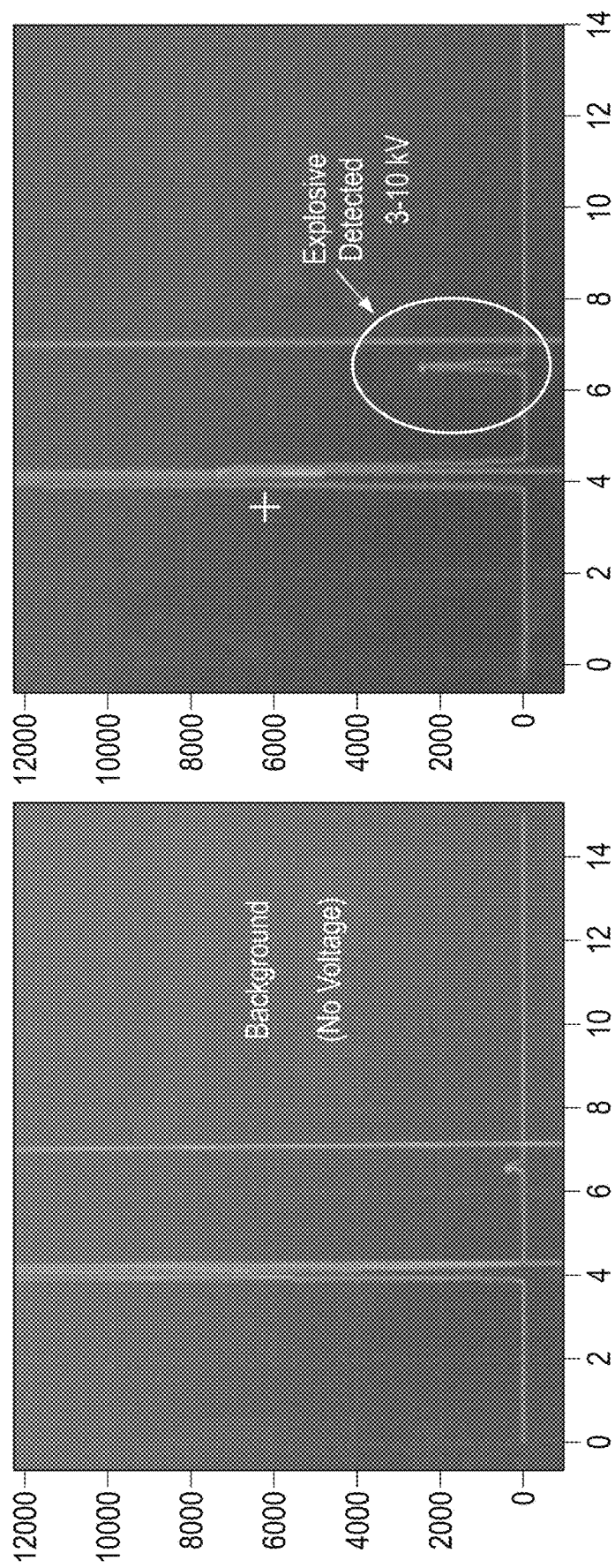
FIG. 14 illustrates examples test results of explosive detection using ADI on an Explosive Trace Detector (ETD) Device.
Figure 15:
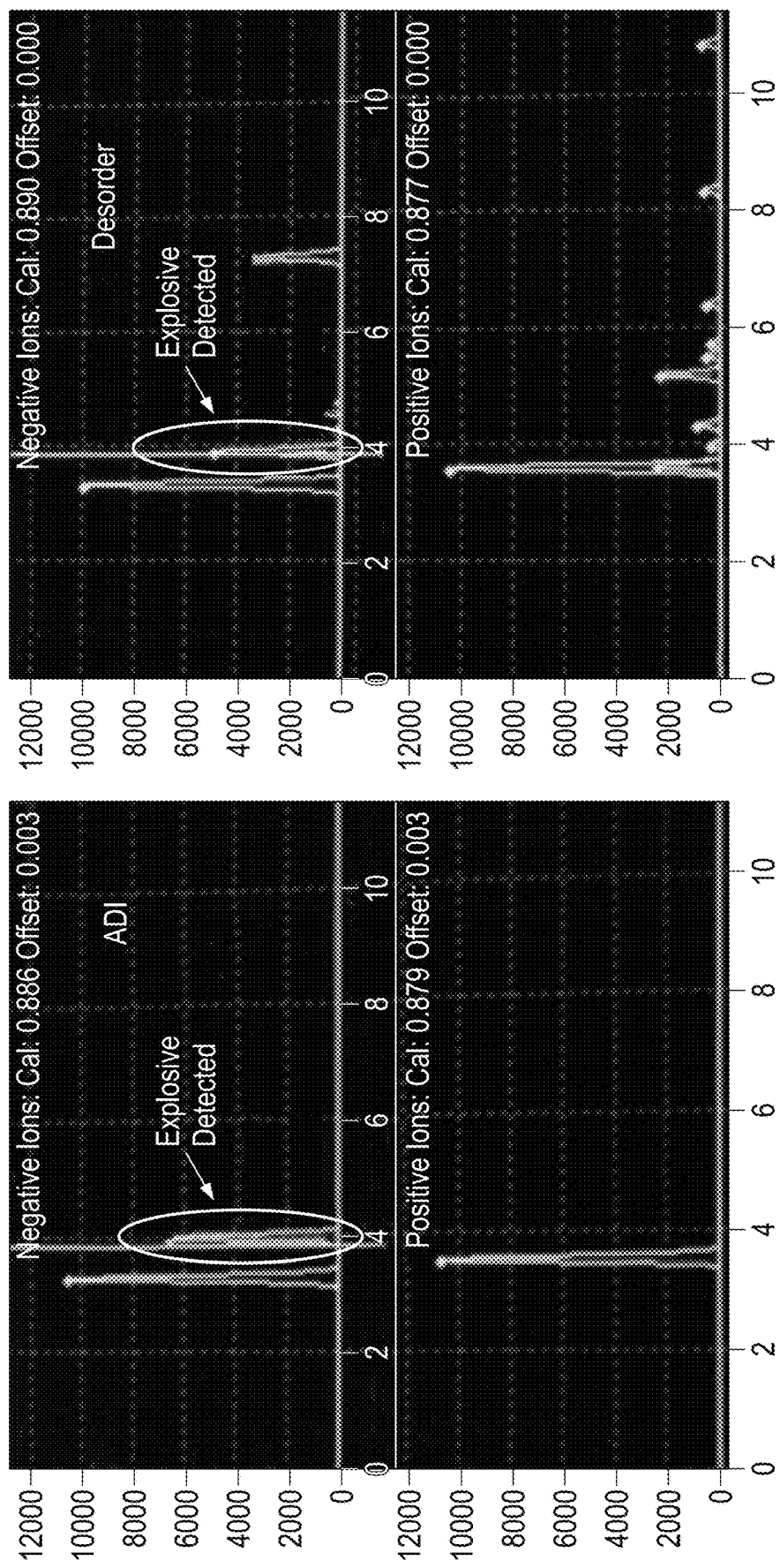
FIG. 15 illustrates examples test results of explosive detection using ADI versus desorption on a standard ETD Device.
Figure 16A:
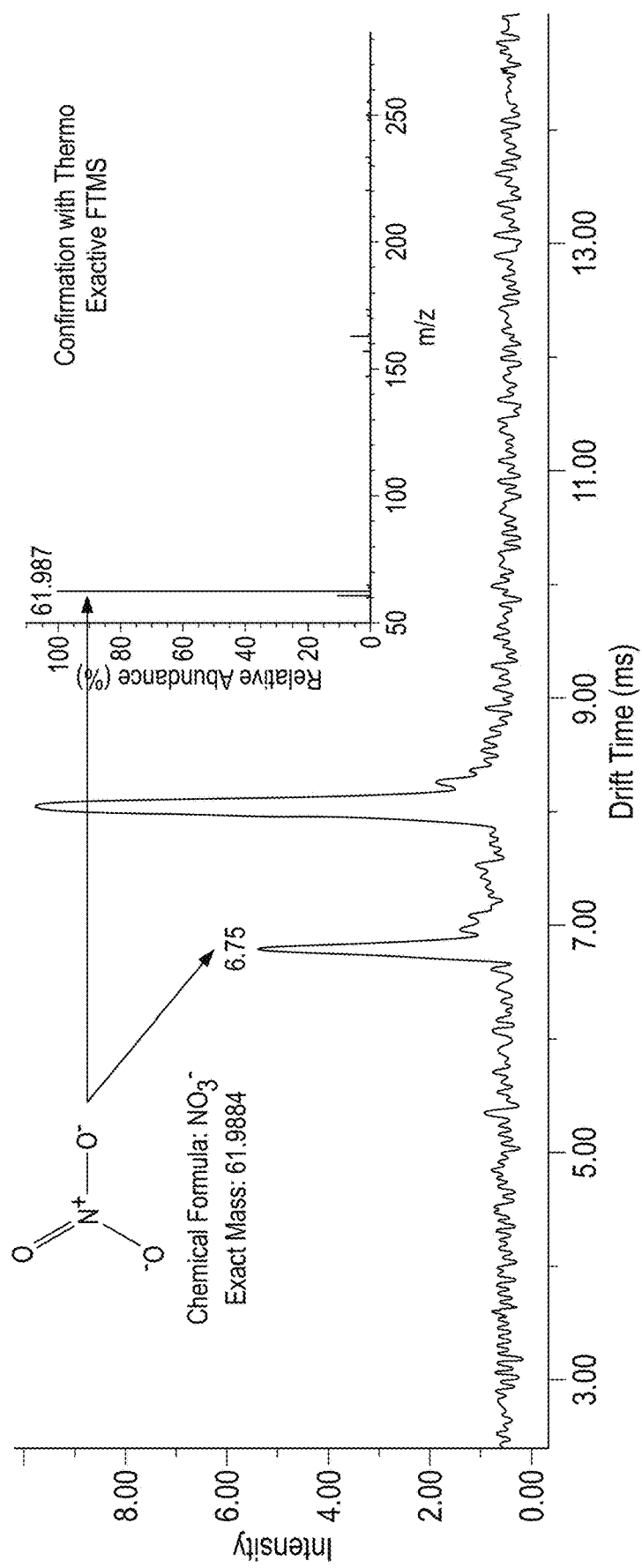
FIGS. 16a-16d illustrate examples of detection of Nitrate-, Perchlorate-, Chlorate-Salts and TNT on an Excellims IMS Device with MS Confirmation.
Figure 16B:
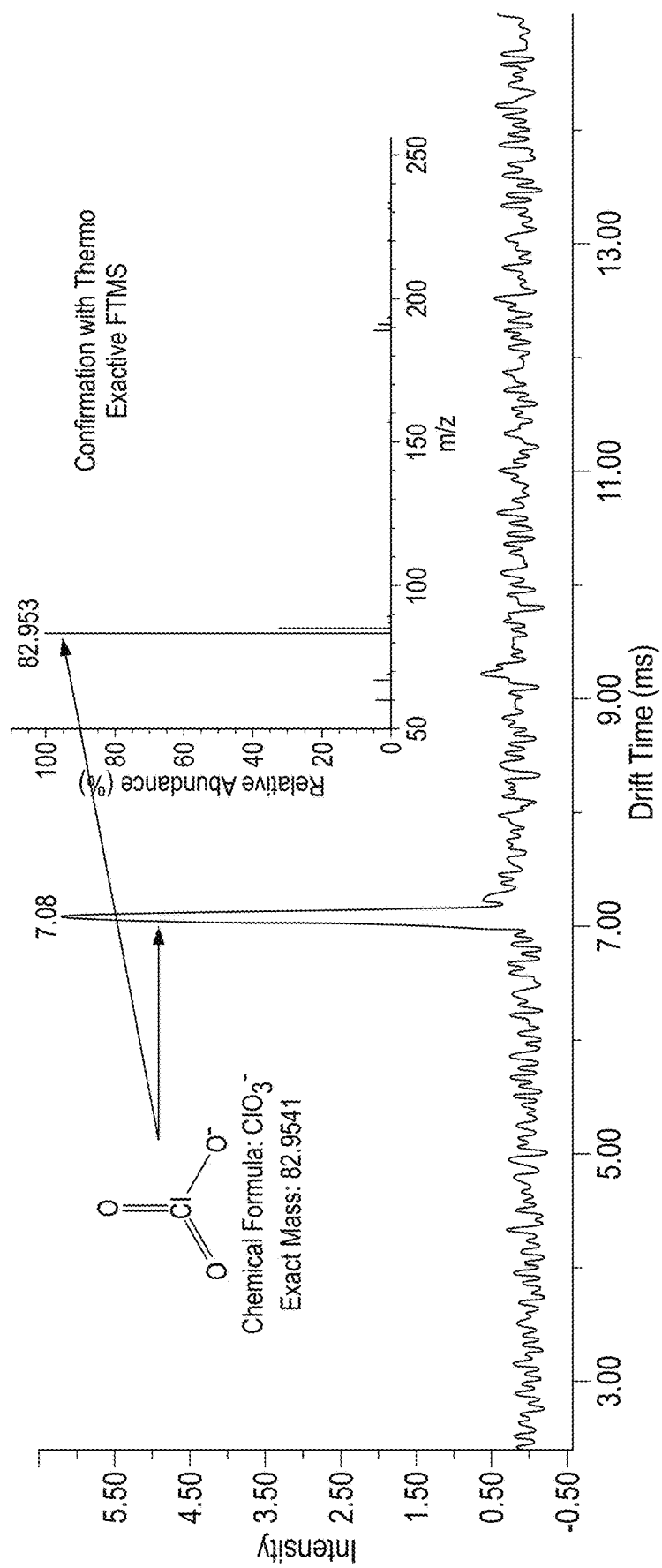
Figure 16C:
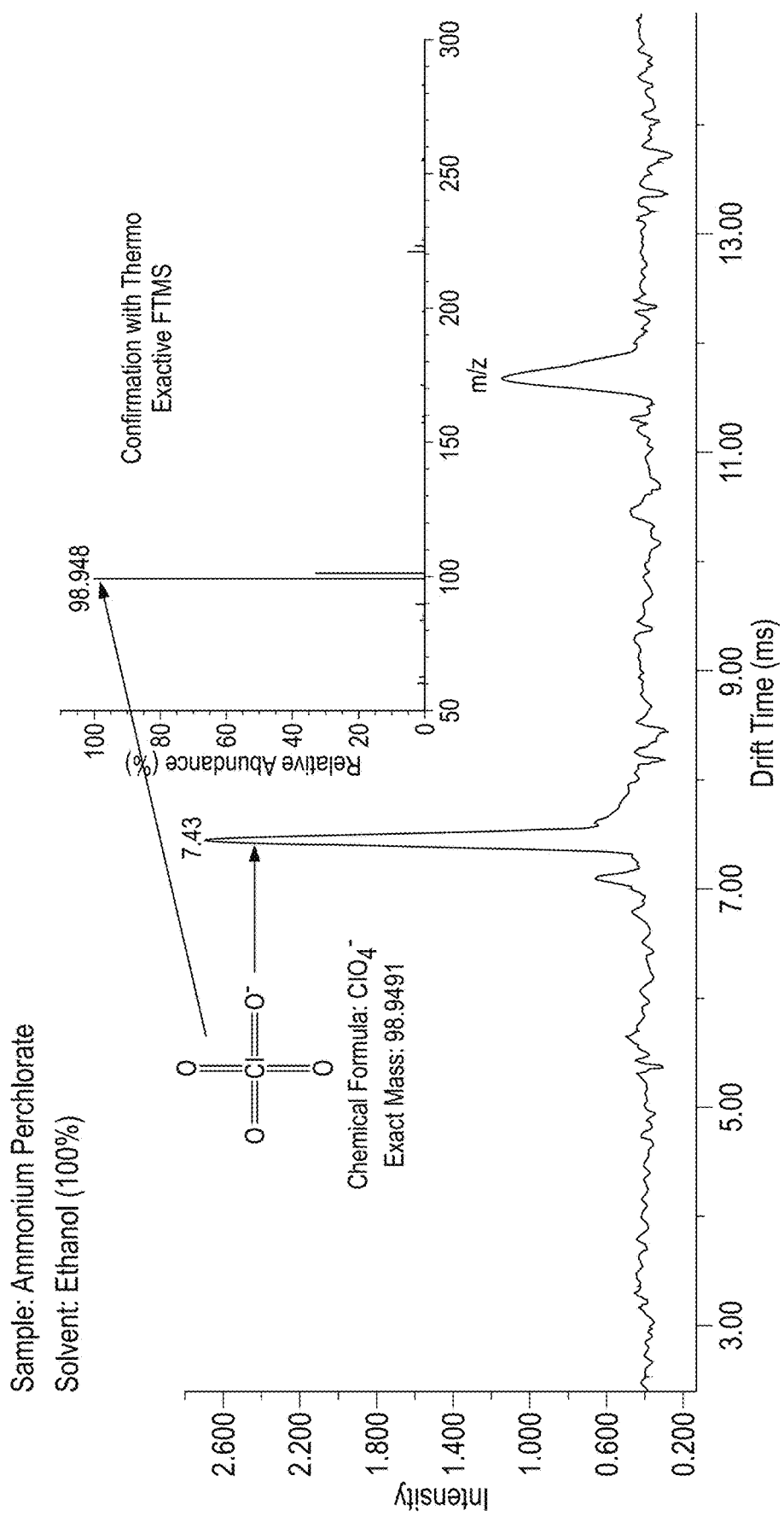
Figure 16D:
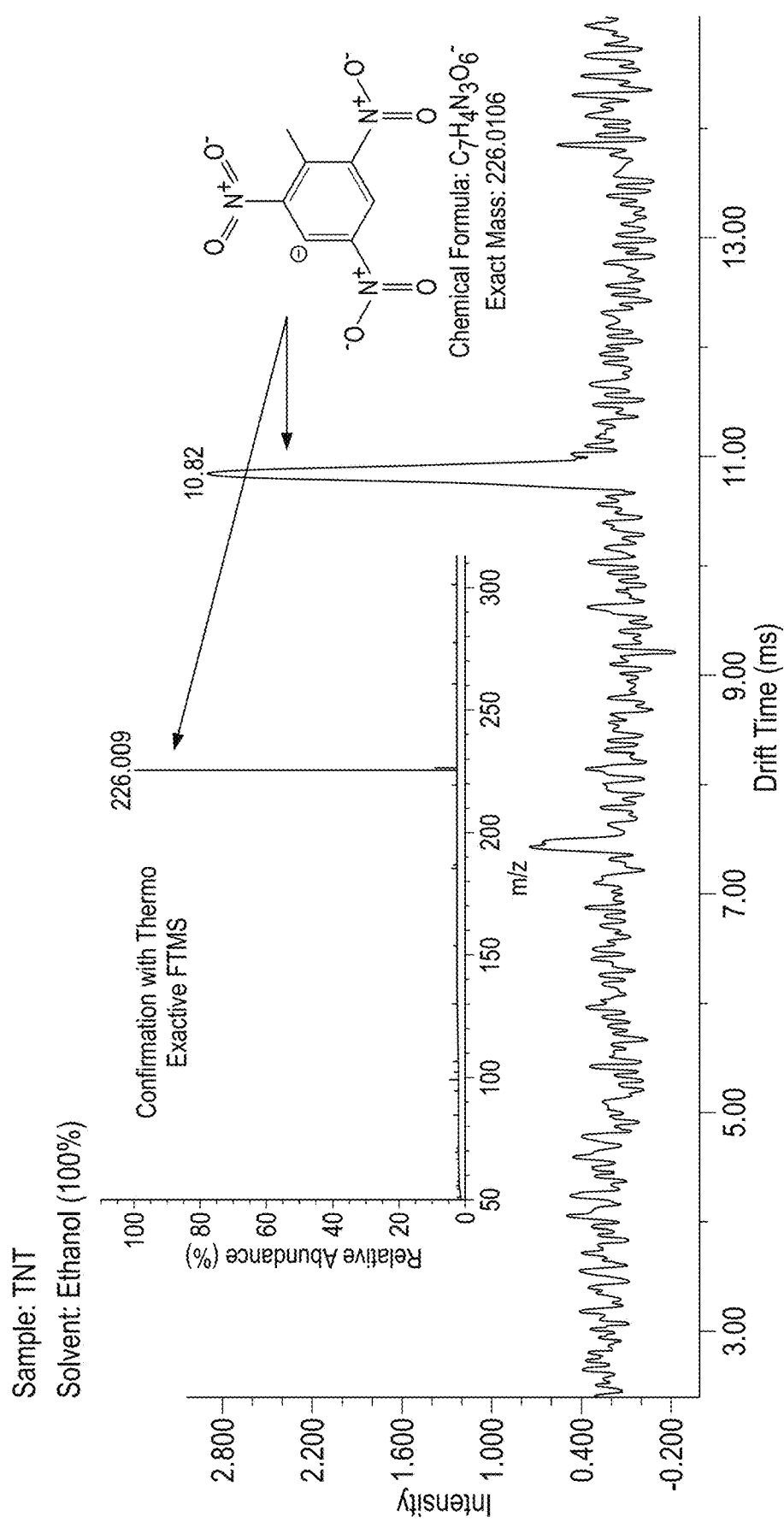

The proposed technique was further tested on commercially available IMS systems to verify its applicability. The ADI source was positioned directly at the inlet of the Ion Track IMS. The power source was attached directly to the swab, which was manipulated (positioned or shaped) so that a point was directed toward the inlet of the instrument, and the voltage was controlled though the charger interface (3-20 kV). Once the sample was ionized and grounded to the entrance of the IMS, the scan initiation was manually triggered to acquire the chromatogram (FIGS. 14 and 15). To ensure there was no carry over or false positive results, the system was first cleared out, and then a blank sample was run that contained only solvent system but no analyte immediately followed by ADI introduction technique with analyte present.

ADI was further tested by coupling it to IMS (Excellims)/MS (Thermo Exactive high accuracy mass spectrometer) system. This setup gives the ultimate confirmation of 1) ionization efficiency, 2) analytes' true identity via accurate mass confirmation, and 3) robustness of the ADI via semi-quantification mechanisms. The setup provided unequivocal confirmation of ADI source suitability for coupling with IMS/MS systems for which it was originally intended for. The presence of non-volatile compounds corresponding to m/z of nitrates, perchlorates and chlorates in the spectra of MS (FIG. 16) upon selection of the peaks in IMS confirmed that ADI can move non-volatile compounds into a gas phase without their decomposition. Alternatively, organic compounds (e.g. TNT) can also be detected without visible degradation allowing for wider application of ADI source in comparison to thermal desorber.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims

What is claimed:

1. Apparatus for chemical trace detection comprising:
an ion mobility spectrometry testing instrument comprising,
an inlet port configured to receive a vaporized analyte, and
a detector configured to analyze the vaporized analyte, at an atmospheric pressure;
a sample swab having a distal end with an analyte release area, said analyte release area having an apex angle of 120 degrees or less;
a sample swab holder disposed in front of the inlet port of the ion mobility spectrometry instrument, said sample swab holder including a platform and an adapter disposed on the platform, wherein the adapter is configured to frictionally hold said sample swab on said platform to position said sample swab with said analyte release area adjacent to and directed toward the inlet;
a high voltage electrical source having
a ground in electrical communication with the inlet port;
a power contact terminal; and
a contact clip having a plurality of fingers each including a first end in electrical communication with said contact terminal and a second end releasably engaging said swab, whereby voltage is selectively applied to an analyte of a chemical sample on said swab and directs an ionized plume of said analyte into said inlet port,
wherein the high voltage electrical source is configured and arranged to apply said voltage such that there is a differential potential between said swab and said inlet port.

2. The apparatus of claim 1 wherein said analyte release area of said swab is a corner of said distal end thereof.

3. The apparatus of claim 2 wherein said corner has an apex angle of 90 degrees.

4. The apparatus of claim 1 wherein said analyte release area of said swab is a shaped tip of said distal end having an apex angle of between about 30 degrees and about 90 degrees.

5. The apparatus of claim 4 wherein said apex angle is about 45 degrees.

6. The apparatus of claim 1 wherein inlet port has an entry plane and said holder is configured and arranged to dispose said analyte release area within +/−5 mm of said entry plane.

7. The apparatus of claim 1 further comprising a swab shaping device.

8. The apparatus of claim 1 further comprising a solvent.

9. The apparatus of claim 8 further comprising a solvent supply having dispenser disposed on said ion mobility spectrometry testing instrument to selectively apply said solvent to said sample swab.

10. Apparatus for chemical trace detection comprising:
a sample swab having a distal end with an analyte release area, said analyte release area having an apex angle of 120 degrees or less;
a sample swab holder, said sample swab holder including a platform and an adapter disposed on the platform, wherein the adapter is configured to frictionally hold said sample swab on said platform to position said sample swab with said analyte release area adjacent to and directed toward an inlet port of an ion mobility spectrometry testing instrument; and
a high voltage electrical source having
a ground in electrical communication with the inlet port;
a power contact terminal; and
a contact clip having a plurality of fingers each including a first end in electrical communication with said contact terminal and a second end releasably engaging said swab, whereby voltage is selectively applied to said an analyte of a chemical sample on said swab and directs an ionized plume of said analyte into said inlet port,
wherein said high voltage electrical source is configured and arranged to apply said voltage such that there is a differential potential between said swab and said inlet port.

11. The apparatus of claim 10 wherein said analyte release area of said swab is a corner of said distal end thereof.

12. The apparatus of claim 10 wherein said corner has an apex angle of 90 degrees.

13. The apparatus of claim 10 wherein said analyte release area of said swab is a shaped tip of said distal end having an apex angle of between about 30 degrees and about 90 degrees.

14. The apparatus of claim 10 further comprising a swab shaping device.

15. The apparatus of claim 10 further comprising a solvent.

16. The apparatus of claim 15 further comprising a solvent supply having dispensing disposed on the ion mobility spectrometry testing instrument to selectively apply said solvent to said sample swab.

17. A method of analyzing a trace chemical residing on a sample swab comprising the steps of:
   providing an ion mobility spectrometry testing instrument comprising,
      an inlet port configured to receive a vaporized analyte, and
      a detector configured to analyze the vaporized analyte, at an atmospheric pressure;
   providing a sample swab having a distal end with an analyte release area, said analyte release area having an apex angle of 120 degrees or less;
   contacting the sample swab with a chemical to be tested;
   providing a holder, said holder including a platform and an adapter disposed on the platform, wherein the adapter is configured to frictionally hold said sample swab on said platform to position the sample swab in front of the inlet port of the spectrometry instrument with said analyte release area adjacent to and directed toward the inlet;
   applying a charge to said trace chemical to ionize said trace chemical and direct an ion plume of said chemical toward said inlet port, wherein said charge is applied such that there is a differential potential between said swab and said inlet port.

18. The method of claim 17 further comprising the step of solvating said swab with a predetermined solvent before applying said charge to said swab.

19. The method of claim 17 further comprising the step of shaping the swab to provide said angled analyte release area.

20. The method of claim 17 wherein said inlet port has an entry plane and said holder is configured and arranged to dispose said analyte release area within +/−5 mm of said entry plane.

* * * * *